(12) United States Patent
Santuka et al.

(10) Patent No.: US 12,506,732 B2
(45) Date of Patent: Dec. 23, 2025

(54) SYSTEM, METHOD, AND COMPUTER-READABLE STORAGE MEDIA FOR AUTHENTICATING AN ENDPOINT DEVICE

(71) Applicant: Cisco Technology, Inc., San Jose, CA (US)

(72) Inventors: Vivek Santuka, Morrisville, NC (US); Jatin Katyal, Murphy, TX (US); Prashant Chauhan, Shimla (IN)

(73) Assignee: CISCO TECHNOLOGY, INC., San Jose, CA (US)

( * ) Notice: Subject to any disclaimer, the term of this patent is extended or adjusted under 35 U.S.C. 154(b) by 581 days.

(21) Appl. No.: 17/932,975

(22) Filed: Sep. 16, 2022

(65) Prior Publication Data
US 2024/0098084 A1    Mar. 21, 2024

(51) Int. Cl.
*H04L 9/40* (2022.01)
*H04L 61/4511* (2022.01)

(52) U.S. Cl.
CPC ...... *H04L 63/0876* (2013.01); *H04L 61/4511* (2022.05); *H04L 63/0236* (2013.01); *H04L 63/0272* (2013.01)

(58) Field of Classification Search
None
See application file for complete search history.

(56) References Cited

U.S. PATENT DOCUMENTS

| | | | | |
|---|---|---|---|---|
| 7,171,555 | B1* | 1/2007 | Salowey | H04W 12/0471 713/168 |
| 8,023,478 | B2* | 9/2011 | Cam-Winget | H04N 21/4126 455/411 |
| 8,341,717 | B1* | 12/2012 | Delker | H04L 63/20 705/56 |
| 8,474,032 | B2* | 6/2013 | Fetik | G06F 21/552 713/151 |
| 8,767,526 | B1 | 7/2014 | Jagannatharao et al. | |
| 9,253,175 | B1* | 2/2016 | Orr | H04L 63/0876 |
| 10,492,071 | B1* | 11/2019 | Havaralu Rama Chandra Adiga | H04W 12/082 |
| 2003/0158960 | A1* | 8/2003 | Engberg | G06Q 30/06 709/228 |
| 2004/0181690 | A1* | 9/2004 | Rothermel | H04L 41/22 726/13 |

(Continued)

FOREIGN PATENT DOCUMENTS

| CN | 1486032 A | * | 3/2004 |
|---|---|---|---|
| CN | 101986598 A | * | 3/2011 |

(Continued)

*Primary Examiner* — Ali H. Cheema
(74) *Attorney, Agent, or Firm* — Baker Botts L.L.P.

(57) ABSTRACT

In one embodiment, a method includes detecting, at a virtual authenticator in an endpoint device, a linkup event, transmitting, to a supplicant in the endpoint device, a request for an identity associated with the endpoint device, receiving, at the virtual authenticator, a response from the supplicant, wherein the response comprises the identity, receiving, from an authentication server, an authorization result, wherein the authorization result is based on authenticating the endpoint device using the received identity, and enforcing, by the virtual authenticator, the authorization result at the endpoint device.

18 Claims, 3 Drawing Sheets

(56) References Cited

U.S. PATENT DOCUMENTS

| | | | | |
|---|---|---|---|---|
| 2006/0036856 | A1* | 2/2006 | Kok | H04W 12/06 713/168 |
| 2006/0039305 | A1* | 2/2006 | Thawani | H04W 12/06 370/310 |
| 2006/0070116 | A1* | 3/2006 | Park | H04L 63/083 726/3 |
| 2006/0143699 | A1* | 6/2006 | Nagata | H04L 63/0227 726/11 |
| 2006/0200670 | A1* | 9/2006 | Kuffel | H04L 9/3263 713/170 |
| 2006/0225129 | A1* | 10/2006 | Inoue | H04L 63/08 726/3 |
| 2007/0038866 | A1* | 2/2007 | Bardsley | H04L 63/0272 713/182 |
| 2007/0101406 | A1* | 5/2007 | Zavalkovsky | H04L 9/3273 726/4 |
| 2007/0118883 | A1* | 5/2007 | Potter | H04L 69/24 713/182 |
| 2007/0250706 | A1* | 10/2007 | Oba | H04L 9/0838 713/159 |
| 2009/0063851 | A1* | 3/2009 | Nijdam | H04W 12/06 713/155 |
| 2009/0086973 | A1* | 4/2009 | Buddhikot | H04L 63/062 380/273 |
| 2011/0066855 | A1* | 3/2011 | Zeng | H04L 63/0869 713/168 |
| 2011/0252230 | A1* | 10/2011 | Segre | H04L 63/162 713/171 |
| 2012/0185927 | A1* | 7/2012 | Nors | H04L 63/0853 726/5 |
| 2015/0381611 | A1* | 12/2015 | Mestanov | H04W 12/06 726/6 |
| 2016/0036781 | A1* | 2/2016 | Leibovitz | H04L 63/105 726/12 |
| 2016/0182499 | A1* | 6/2016 | Sharaga | G06F 21/82 713/156 |
| 2017/0164200 | A1* | 6/2017 | Näslund | H04W 12/069 |
| 2017/0289291 | A1* | 10/2017 | S | H04L 12/2898 |
| 2018/0198786 | A1* | 7/2018 | Shah | H04W 12/069 |
| 2018/0310172 | A1* | 10/2018 | Sethi | H04L 63/205 |
| 2019/0068617 | A1* | 2/2019 | Coleman | H04L 63/0876 |
| 2020/0137056 | A1* | 4/2020 | Havaralu Rama Chandra Adiga | H04L 63/0892 |
| 2020/0322380 | A1* | 10/2020 | Sheth | H04L 63/162 |
| 2021/0067329 | A1* | 3/2021 | Coyle | H04L 63/065 |
| 2022/0264299 | A1* | 8/2022 | Ben-Shalom | H04W 12/065 |
| 2023/0396557 | A1* | 12/2023 | Pazhyannur | H04L 63/0892 |

FOREIGN PATENT DOCUMENTS

| | | | | |
|---|---|---|---|---|
| EP | 1919156 A1 | * | 5/2008 | ............ H04W 12/06 |
| KR | 20170016878 A | * | 2/2017 | ......... H04L 63/0236 |
| WO | WO-2006001587 A1 | * | 1/2006 | ......... H04L 12/4641 |
| WO | WO-2006001647 A1 | * | 1/2006 | ............ H04L 41/042 |
| WO | WO-2011003256 A1 | * | 1/2011 | ........ H04W 36/0064 |

* cited by examiner

SYSTEM, METHOD, AND COMPUTER-READABLE STORAGE MEDIA FOR AUTHENTICATING AN ENDPOINT DEVICE

TECHNICAL FIELD

The present disclosure relates generally to networking, and more specifically to providing a virtual authenticator and a supplicant in the same endpoint device.

BACKGROUND

End user devices are increasingly remote and outside of corporate networks. Further, the increasing use of software as a service (SaaS) and infrastructure as a service (IaaS) reduces the control of an organization over endpoint devices, particularly with respect to context-based access control.

BRIEF DESCRIPTION OF THE DRAWINGS

For a more complete understanding of the present disclosure and for further features and advantages thereof, reference is now made to the following description taken in conjunction with the accompanying drawings, in which.

DESCRIPTION OF EXAMPLE EMBODIMENTS

Overview

End user devices are increasingly remote and outside of corporate networks. Further, the increasing use of software as a service (SaaS) and infrastructure as a service (IaaS) reduces the control of an organization over endpoint devices, particularly with respect to context-based access control. Further, when an endpoint device connects to a network outside of an organization, the organization may not be able to apply network-based access control. The organization may also not be able to apply access control to virtual machines or containers. The ability of an organization to respond to malicious activity on the endpoint device is reduced. Standard 802.1x-based access control uses authenticators which are network devices (e.g., switches or access points) to which the endpoint device connects. This disclosure proposes moving authenticator to the endpoint device itself, thereby extending authentication and policy enforcement infrastructure to remote endpoint devices.

According to an embodiment, a system includes one or more processors and one or more computer-readable non-transitory storage media coupled to the one or more processors. The one or more computer-readable non-transitory storage media include instructions that, when executed by the one or more processors, cause one or more components of the system to perform operations including detecting, at a virtual authenticator in an endpoint device, a linkup event; transmitting, to a supplicant in the endpoint device, a request for an identity associated with the endpoint device; receiving, at the virtual authenticator, a response from the supplicant, and the response includes the identity; receiving, from an authentication server, an authorization result, and the authorization result is based on authenticating the endpoint device using the received identity; and enforcing, by the virtual authenticator, the authorization result at the endpoint device.

In certain embodiments, the operations may include receiving, at the virtual authenticator from the authentication server, a virtual private network (VPN) required command, and transmitting, to a VPN client in the endpoint device, a VPN request. The operations may also include transmitting, to a VPN client in the endpoint device, a VPN request. In certain embodiments, the operations may include receiving, by the virtual authenticator, one or more Domain Name System (DNS) entries, and installing, by the virtual authenticator, the one or more DNS entries in a DNS resolution file in the endpoint device. In certain embodiments, the operations may include receiving, by the virtual authenticator from the authentication server, a change of authorization, and enforcing, by the virtual authenticator, the change of authorization at the endpoint device.

According to another embodiment, a method includes detecting, at a virtual authenticator in an endpoint device, a linkup event; transmitting, to a supplicant in the endpoint device, a request for an identity associated with the endpoint device; receiving, at the virtual authenticator, a response from the supplicant, and the response includes the identity; receiving, from an authentication server, an authorization result, and the authorization result is based on authenticating the endpoint device using the received identity; and enforcing, by the virtual authenticator, the authorization result at the endpoint device.

According to yet another embodiment, one or more computer-readable non-transitory storage media embody instructions that, when executed by a processor, cause the processor to perform operations including detecting, at a virtual authenticator in an endpoint device, a linkup event; transmitting, to a supplicant in the endpoint device, a request for an identity associated with the endpoint device; receiving, at the virtual authenticator, a response from the supplicant, and the response includes the identity; receiving, from an authentication server, an authorization result, and the authorization result is based on authenticating the endpoint device using the received identity; and enforcing, by the virtual authenticator, the authorization result at the endpoint device.

Technical advantages of certain embodiments of this disclosure may include one or more of the following. Embodiments of this disclosure introduce a virtual authenticator as part of the endpoint or operating system itself. Embodiments of this disclosure will facilitate requesting an endpoint setup for a virtual private network (VPN) connection if certain criteria are triggered. Traffic may be forced to go through a stronger security stack. Embodiments of this disclosure may also allow the ability to send DNS entries as a Remote Authentication Dial-In User Service (RADIUS) result that may be installed on the endpoint's DNS resolution file by a virtual authenticator. This enables traffic to be forced through security applications if a certain event is triggered. Embodiments of this disclosure may also receive authorization results from a RADIUS server and enforce the results using application programming interfaces (APIs) of the underlying systems. As a result, embodiments of this disclosure extend authentication and policy enforcement infrastructure to remote endpoint devices and enable remote endpoint devices to have the same rapid threat control and security integrations found in local endpoint devices.

Other technical advantages will be readily apparent to one skilled in the art from the following figures, descriptions, and claims. Moreover, while specific advantages have been enumerated above, various embodiments may include all, some, or none of the enumerated advantages.

Example Embodiments

Figure 1:
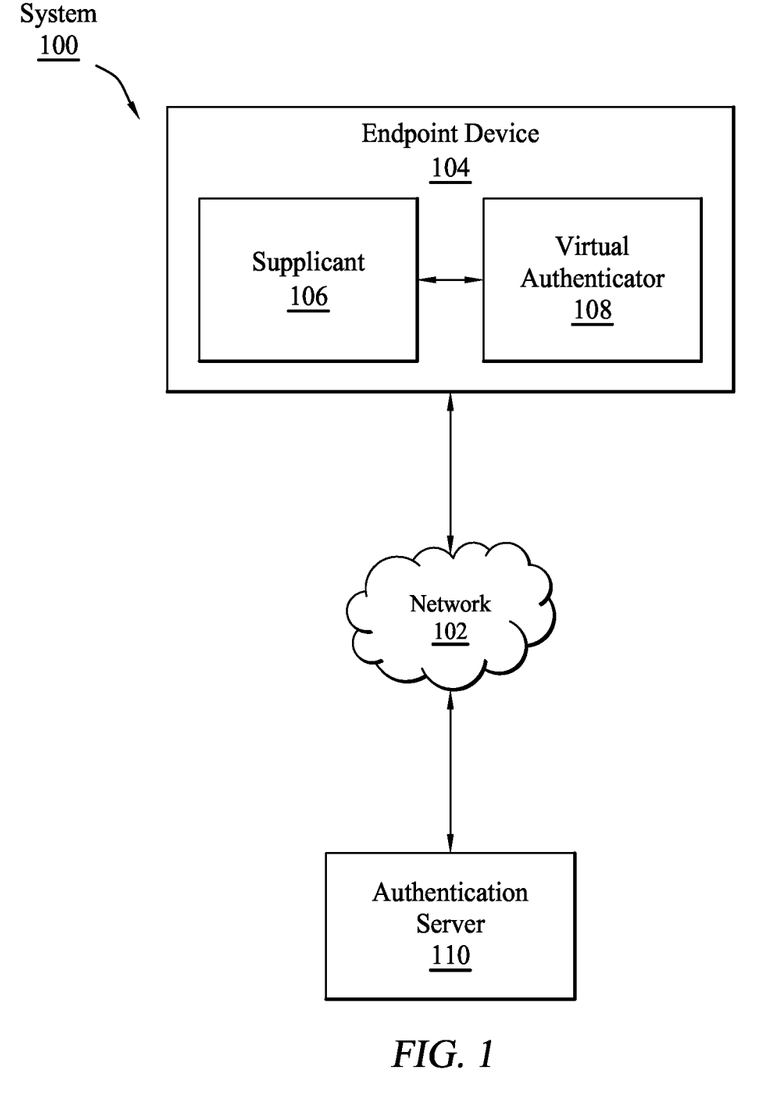
FIG. 1 illustrates a system for providing a virtual authenticator and a supplicant in an endpoint device, in accordance with certain embodiments.
Figure 2:
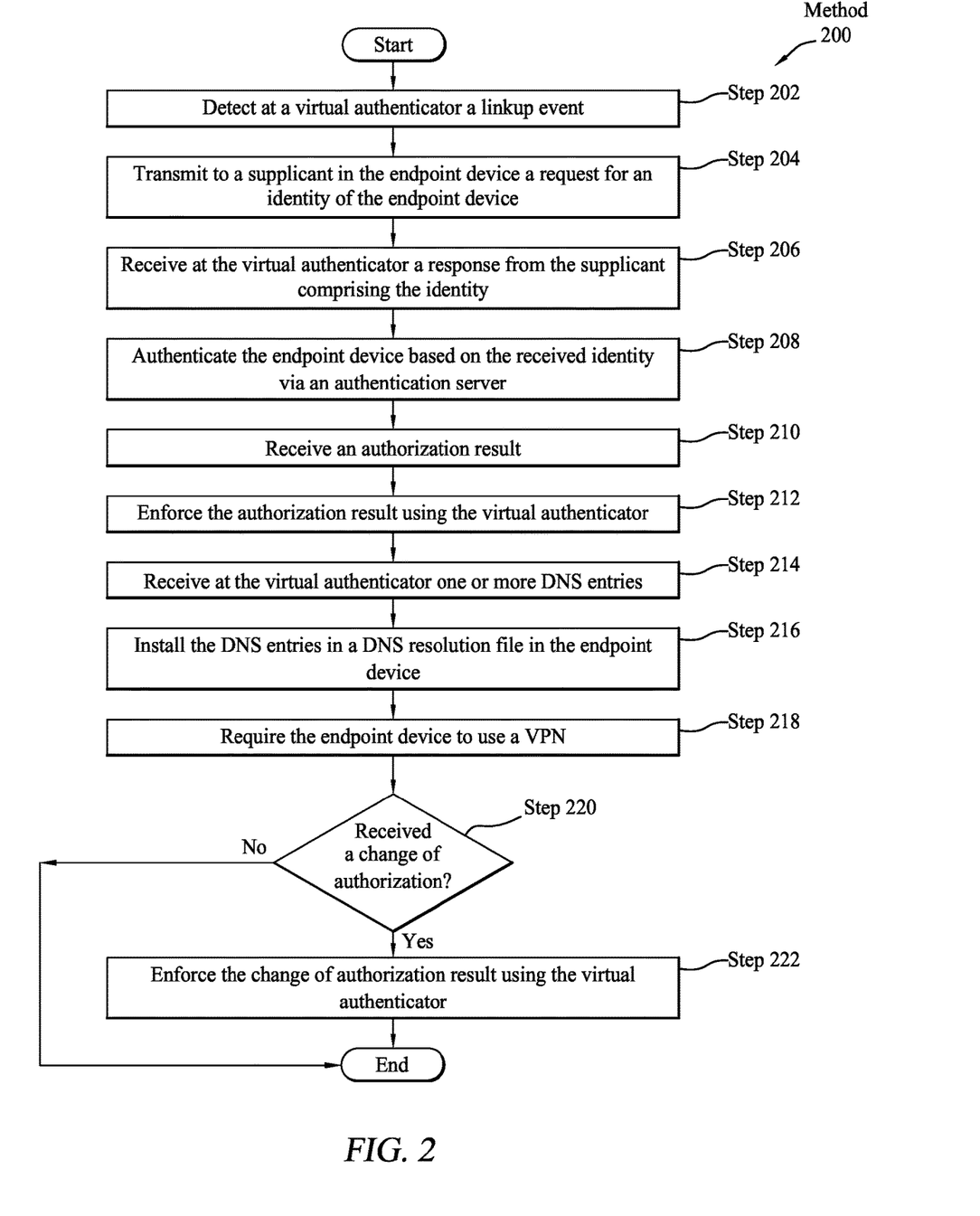
FIG. 2 illustrates a method for providing a virtual authenticator and a supplicant in an endpoint device, in accordance with certain embodiments.
Figure 3:
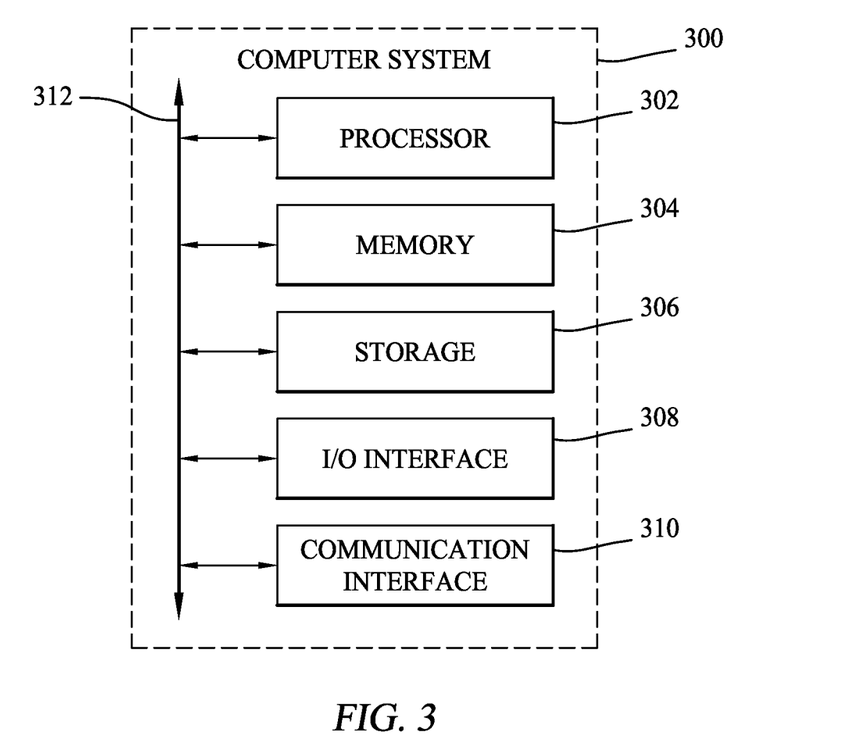
FIG. 3 illustrates an example of a computer system, in accordance with certain embodiments.

This disclosure describes systems and methods for providing a virtual authenticator and a supplicant in an endpoint device. FIG. 1 illustrates a system for providing a virtual authenticator and a supplicant in an endpoint device, in accordance with certain embodiments. FIG. 2 illustrates a method for providing a virtual authenticator and a supplicant in an endpoint device, in accordance with certain embodiments. FIG. 3 illustrates an example of a computer system, in accordance with certain embodiments.

FIG. 1 illustrates a system for providing a virtual authenticator and a supplicant in an endpoint device, in accordance with certain embodiments. In the illustrated embodiment, system 100 includes network 102, endpoint device 104, supplicant 106, virtual authenticator 108, and authentication server 110.

Network 102 is any type of network that facilitates communication between components of system 100. Network 102 may connect one or more components of system 100. One or more portions of network 102 may include an ad-hoc network, an intranet, an extranet, a virtual private network (VPN), an Ethernet VPN (EVPN), a local area network (LAN), a wireless LAN (WLAN), a virtual LAN (VLAN), a wide area network (WAN), a wireless WAN (WWAN), an SD-WAN, a metropolitan area network (MAN), a portion of the Internet, a portion of the Public Switched Telephone Network (PSTN), a cellular telephone network, a Digital Subscriber Line (DSL), an Multiprotocol Label Switching (MPLS) network, a 3G/4G/5G network, a Long Term Evolution (LTE) network, a cloud network, a combination of two or more of these, or other suitable types of networks. Network 102 may include one or more different types of networks. Network 102 may be any communications network, such as a private network, a public network, a connection through the Internet, a mobile network, a WI-FI network, etc. One or more components of system 100 may communicate over network 102. Network 102 may include a core network (e.g., the Internet), an access network of a service provider, an Internet service provider (ISP) network, and the like.

Endpoint device 104 may refer to a device that a user uses to communicate with other components of system 100 via network 102. Examples of an endpoint device 104 may include a desktop computer system, a laptop or notebook computer system, a mobile telephone (such as a smartphone), a personal digital assistant (PDA), a tablet computer system, and so on. The user may further use endpoint device 104 to receive and respond to certain authentication factors. For example, the user may have an account established with a policy server (e.g., Cisco® Identity Services Engine (ISE)), and the user may have pre-configured the account such that second authentication factors are pushed to an application running on the endpoint device 104. As one example, the user may have an account established with an authentication application, such as Cisco Duo®, and the user may have pre-configured the account such that authentication prompts, such as Duo-pushes, are pushed to a Duo® Connect application running on endpoint device 104.

Supplicant 106 may include software running on one or more components of endpoint device 104 to facilitate authentication of endpoint device 104. In certain embodiments, supplicant 106 exchanges Extensible Authentication Protocol (EAP) packets with virtual authenticator 108. In certain embodiments, supplicant 106 may request access to network 102 or a service made available by a peer device in the network 102 and, as a result, may require authentication by network 102. Supplicant 106 contains the credentials used for authentication and may form one end of an EAP exchange with virtual authenticator 108. Supplicant 106 and virtual authenticator 108 are located on the same endpoint device 104 thereby allowing supplicant 106 to exchange EAP packets with virtual authenticator 108 within endpoint device 104.

Virtual authenticator 108 is located on endpoint device 104 and is configured to operate as a client of authentication server 110. Virtual authenticator 108 may comprise software running on one or more components of endpoint device 104. In certain embodiments, virtual authenticator 108 acts as a Remote Authentication Dial-In User Service (RADIUS) client that authenticates endpoint device 104 via authentication server 110. In certain embodiments, virtual authenticator 108 may detect a linkup event. For example, virtual authenticator 108 may detect the linkup event when it receives one or more EAP packets. In certain embodiments, virtual authenticator 108 may detect the linkup event when endpoint device 104 attempts to connect to network 102. In certain embodiments, virtual authenticator 108 may exchange EAP packets with supplicant 106 as part of authenticating endpoint device 104. In certain embodiments, virtual authenticator 108 may behave as an authenticator client interacting with authentication server 110. For example, virtual authenticator 108 may behave as a RADIUS client and may encapsulate EAP data in RADIUS packets that are sent to authentication server 110. Virtual authenticator 108 may also receive authorization results from authentication server 110 and enforce the authorization results on endpoints device 104. For example, virtual authenticator 108 may enforce the authorization results using a firewall located on endpoint device 104. The firewall may only permit traffic that endpoint device 104 is authorized to receive. The firewall may block traffic that endpoint device 104 is not authorized to receive. As another example, virtual authenticator 108 may enforce the authorization results by implementing a filtering service as a host-based firewall on endpoint device 104. As another example, virtual authenticator 108 may enforce the authorization results using various application programming interfaces (APIs) (e.g., VMware NSX®, Amazon Web Services®, etc.). In certain embodiments, virtual authenticator 108 may receive a change of authorization and reauthentication request from authentication server 110. For example, virtual authenticator 108 may receive a change of authorization from authorization server 110 if malicious activity has been detected on endpoint device 104. As another example, virtual authenticator 108 may receive a change of authorization from authorization server 110 if a predefined time period has elapsed since the previous authorization. Virtual authenticator 108 may then implement and enforce the new authorization results.

Authentication server 110 authenticates endpoint device 104 in a first level of authentication. In certain embodiments, authentication server 110 may comprise a module having authentication, authorization, and account (AAA) capabilities. As known and understood by those skilled in the art, AAA capabilities may help secure wireless networks (e.g., network 102) against unauthorized access. In certain embodiments, authentication server 110 may comprise a RADIUS server having AAA capabilities. In certain embodiments, authentication server 110 may comprise a Terminal Access Controller Access-Control System Plus (TACACS+) server. In certain embodiments, authentication server 110 may communicate with a policy server (e.g., Cisco® ISE). In some embodiments, authentication server 110 may verify that the user of endpoint device 104 has provided valid login credentials associated with the user. Examples of login credentials include a username and password. In certain embodiments, authentication server 110 may validate the citizenship of the user of endpoint device 104. Authentication server 110 may maintain a mapping of user credentials to user citizenship. Authentication server 110 may use any suitable authentication and authorization process.

In an exemplary embodiment of operation, endpoint device 104 includes supplicant 106 and virtual authenticator 108. Virtual authenticator 108 receives one or more EAP packets. Virtual authenticator 108 transmits a request for an identity associated with endpoint device 104 to supplicant 106. Supplicant 106 transmits a response to virtual authenticator 108. The response comprises the identity associated with endpoint device 104. Virtual authenticator 108 further receives an authorization result from authentication server 110 and the authorization result is based on authenticating endpoint device 104 using the identity previously transmitted from supplicant 106 to virtual authenticator 108. Virtual authenticator 108 enforces the authorization result at endpoint device 104. In certain embodiments, virtual authenticator 108 may use an application programming interface (API) to enforce the authorization result at endpoint device 104. In certain other embodiments, virtual authenticator 108 may use a firewall to enforce the authorization result at endpoint device 104.

In certain embodiments, virtual authenticator 108 may receive a command from authentication server 110, and the command requires endpoint device 104 to connect to a virtual private network (VPN). For example, virtual authenticator may receive the command requiring endpoint device 104 to connect to a VPN in order to secure a remote connection to network 102 when malicious activity has been detected on endpoint device 104. As another example, virtual authenticator may receive the command requiring endpoint device 104 to connect to a VPN if a trust level of endpoint device 104 has dropped below a predefined threshold. Virtual authenticator 108 may transmit a request for a VPN connection to a VPN client in endpoint device 104.

In certain embodiments, virtual authenticator 108 may receive one or more domain name system (DNS) entries. Virtual authenticator 108 may install the one or more received DNS entries in a DNS resolution file in endpoint device 104. For example, the one or more received DNS entries may allow network traffic to be forced through security applications such as a Cisco Duo® access gateway if a certain event is triggered. For example, network traffic may be forced through security applications if a user of endpoint device 104 has downloaded malware or otherwise breached security protocols within network 102. As another example, network traffic may be forced through security applications if a trust level of endpoint device 104 has dropped below a predefined threshold. In certain embodiments, virtual authenticator 108 may receive a change of authorization from authorization server 110. For example, if a third-party software application detects malicious activity on the endpoint device, the third-party software may trigger a change of authorization from authorization server 110. The third-party software application may be installed on the endpoint device or may me remote from the endpoint device. Virtual authenticator 108 may enforce the change of authorization at endpoint device 104 in the manner described above using, for example, an API or a firewall on endpoint device 104.

Although FIG. 1 illustrates a particular number of networks 102, endpoint devices 104, supplicants 106, virtual authenticators 108, and authentication servers 110, this disclosure contemplates any suitable number of networks 102, endpoint devices 104, supplicants 106, virtual authenticators 108, and authentication servers 110. Additionally, this disclosure contemplates any suitable arrangement of network 102, endpoint device 104, supplicant 106, virtual authenticator 108, and authentication server 110. Additionally, this disclosure contemplates any suitable combination of any suitable components, devices, or systems carrying out any suitable actions.

FIG. 2 illustrates a method for providing a virtual authenticator and a supplicant in an endpoint device, in accordance with certain embodiments. Method 200 begins at step 202. At step 202, a virtual authenticator (e.g., virtual authenticator 108 of FIG. 1) on an endpoint device (e.g., endpoint device 104 of FIG. 1) detects a linkup event. In certain embodiments, the virtual authenticator may detect the linkup event when the endpoint device attempts to connect to a network (e.g., network 102 of FIG. 1). In certain embodiments, the virtual authenticator may detect a linkup event by receiving one or more EAP packets. The virtual authenticator receives the one or more EAP packets in order to begin authentication of the endpoint device. For example, the virtual authenticator may receive the EAP packets from a supplicant running on the endpoint device and use data in the EAP packets to authenticate the endpoint device via an authentication server. Method 200 then moves from step 202 to step 204.

At step 204, the virtual authenticator transmits a request for an identity of the endpoint device to a supplicant (e.g., supplicant 106 of FIG. 1) on the endpoint device. The virtual authenticator requests the identity in order to encapsulate the identity in an authentication request sent to an authentication server to authenticate the endpoint device. Method 200 then moves from step 204 to step 206.

At step 206, the virtual authenticator receives a response comprising the identity of the endpoint device from the supplicant. Method 200 then moves from step 206 to step 208.

At step 208, the virtual authenticator authenticates the endpoint device via an authentication server (e.g., authentication server 110 of FIG. 1) based on the received identity. Method 200 then moves from step 208 to step 210.

At step 210, the virtual authenticator receives an authorization result from the authentication server. For example, the authorization result may include an access reject response indicating that the endpoint device is restricted from accessing a resource. The authorization result may further include a reason for the access reject response. As another example, the authorization result may include an access accept response indicating that the endpoint device is allowed to access a resource. Method 200 then moves from step 210 to step 212.

At step 212, the virtual authenticator enforces the authorization result on the endpoint device. For example, the virtual authenticator may use an API for enforcing the authorization result at the endpoint device. As a further example, the virtual authenticator may use a firewall for enforcing the authorization result at the endpoint device. The firewall may only permit traffic that endpoint device 104 is authorized to receive. The firewall may block traffic that endpoint device 104 is not authorized to receive. Method 200 then moves from step 212 to step 214.

At step 214, the virtual authenticator receives one or more DNS entries. The DNS entries may be used by the virtual authenticator to force traffic through security applications such as a Cisco Duo® access gateway to improve network security. Method 200 then moves from step 214 to step 216.

At step 216, the virtual authenticator installs the DNS entries in a DNS resolution file on the endpoint device. The one or more received DNS entries may allow network traffic to be forced through security applications such as a Cisco Duo® access gateway if a certain event is triggered. For example, network traffic may be forced through security applications if a user of the endpoint device has downloaded malware or otherwise breached security protocols within the network. As another example, network traffic may be forced through security applications if a trust level of the endpoint device has dropped below a predefined threshold. Method 200 then moves from step 216 to step 218.

At step 218, the virtual authenticator requires the endpoint device to connect to a VPN. The virtual authenticator may require the endpoint device to connect to a VPN in order to secure a remote connection to a network (e.g., network 102 of FIG. 1) when malicious activity has been detected on the endpoint device. For example, the virtual authenticator may receive a command requiring the endpoint device use a VPN connection. As another example, the virtual authenticator may require the endpoint device to connect to a VPN if a trust level of the endpoint device has dropped below a predefined threshold. Method 200 then moves from step 218 to step 220.

At step 220, the virtual authenticator may receive a change of authorization from the authorization server. For example, the virtual authenticator may receive a change of authorization from the authorization server if malicious activity has been detected on the endpoint device. For example, if a third-party software application detects malicious activity on the endpoint device, the third-party software may trigger a change of authorization from authorization server 110. The third-party software application may be installed on the endpoint device or may me remote from the endpoint device. As another example, the virtual authenticator may receive a change of authorization from the authorization server if a predefined time period has elapsed since the previous authorization. If the virtual authenticator receives a change of authorization from the authorization server, method 200 moves from step 220 to step 222. If the virtual authenticator does not receive a change of authorization from the authorization server, method 200 ends at step 220.

At step 222, the virtual authenticator enforces the change of authorization result on the endpoint device. Method 200 ends at step 222.

Although this disclosure describes and illustrates an example method 200 for a method for providing a virtual authenticator and a supplicant in an endpoint device, including the particular steps of the method of FIG. 2, this disclosure contemplates any suitable method 200 for a method for providing a virtual authenticator and a supplicant in an endpoint device, including any suitable steps, which may include all, some, or none of the steps of the method of FIG. 2, where appropriate. Although this disclosure describes and illustrates particular steps of method 200 of FIG. 2 as occurring in a particular order, this disclosure contemplates any suitable steps of method 200 of FIG. 2 occurring in any suitable order. Although this disclosure describes and illustrates particular components, devices, or systems carrying out particular steps of method 200 of FIG. 2, this disclosure contemplates any suitable combination of any suitable components, devices, or systems carrying out any suitable steps of method 200 of FIG. 2.

FIG. 3 illustrates an example of a computer system, in accordance with certain embodiments. In particular embodiments, one or more computer systems 300 provide functionality described or illustrated herein. As an example, one or more computer systems 300 may be used to provide at least a portion of network 100, endpoint device 102, supplicant 104, virtual authenticator 106, or authentication server 108 as described with respect to FIG. 1. As another example, one or more computer systems 300 may be used to perform one or more steps as described with respect to FIG. 2. In particular embodiments, software running on one or more computer systems 300 provides functionality described or illustrated herein or performs one or more steps of one or more methods described or illustrated herein. Particular embodiments include one or more portions of one or more computer systems 300. Herein, reference to a computer system may encompass a computing device, and vice versa, where appropriate. Moreover, reference to a computer system may encompass one or more computer systems, where appropriate.

This disclosure contemplates any suitable number of computer systems 300. This disclosure contemplates computer system 300 taking any suitable physical form. As example and not by way of limitation, computer system 300 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, a tablet computer system, an augmented/virtual reality device, or a combination of two or more of these. Where appropriate, computer system 300 may include one or more computer systems 300; be unitary or distributed; span multiple locations; span multiple machines; span multiple data centers; or reside in a cloud, which may include one or more cloud components in one or more networks. Where appropriate, one or more computer systems 300 may perform without substantial spatial or temporal limitation one or more steps of one or more methods described or illustrated herein. As an example and not by way of limitation, one or more computer systems 300 may perform in real time or in batch mode one or more steps of one or more methods described or illustrated herein. One or more computer systems 300 may perform at different times or at different locations one or more steps of one or more methods described or illustrated herein, where appropriate.

In particular embodiments, computer system 300 includes a processor 302, memory 304, storage 306, an input/output (I/O) interface 308, a communication interface 310, and a bus 312. Although this disclosure describes and illustrates a particular computer system having a particular number of particular components in a particular arrangement, this disclosure contemplates any suitable computer system having any suitable number of any suitable components in any suitable arrangement.

In particular embodiments, processor 302 includes hardware for executing instructions, such as those making up a computer program. As an example and not by way of limitation, to execute instructions, processor 302 may retrieve (or fetch) the instructions from an internal register, an internal cache, memory 304, or storage 306; decode and execute them; and then write one or more results to an internal register, an internal cache, memory 304, or storage 306. In particular embodiments, processor 302 may include one or more internal caches for data, instructions, or addresses. This disclosure contemplates processor 302 including any suitable number of any suitable internal caches, where appropriate. As an example, and not by way of limitation, processor 302 may include one or more instruction caches, one or more data caches, and one or more translation lookaside buffers (TLBs). Instructions in the instruction caches may be copies of instructions in memory 304 or storage 306, and the instruction caches may speed up retrieval of those instructions by processor 302. Data in the data caches may be copies of data in memory 304 or storage 306 for instructions executing at processor 302 to operate on; the results of previous instructions executed at processor 302 for access by subsequent instructions executing at processor 302 or for writing to memory 304 or storage 306; or other suitable data. The data caches may speed up read or write operations by processor 302. The TLBs may speed up virtual-address translation for processor 302. In particular embodiments, processor 302 may include one or more internal registers for data, instructions, or addresses. This disclosure contemplates processor 302 including any suitable number of any suitable internal registers, where appropriate. Where appropriate, processor 302 may include one or more arithmetic logic units (ALUs); be a multi-core processor; or include one or more processors 302. Although this disclosure describes and illustrates a particular processor, this disclosure contemplates any suitable processor.

In particular embodiments, memory 304 includes main memory for storing instructions for processor 302 to execute or data for processor 302 to operate on. As an example and not by way of limitation, computer system 300 may load instructions from storage 306 or another source (such as, for example, another computer system 300) to memory 304. Processor 302 may then load the instructions from memory 304 to an internal register or internal cache. To execute the instructions, processor 302 may retrieve the instructions from the internal register or internal cache and decode them. During or after execution of the instructions, processor 302 may write one or more results (which may be intermediate or final results) to the internal register or internal cache. Processor 302 may then write one or more of those results to memory 304. In particular embodiments, processor 302 executes only instructions in one or more internal registers or internal caches or in memory 304 (as opposed to storage 306 or elsewhere) and operates only on data in one or more internal registers or internal caches or in memory 304 (as opposed to storage 306 or elsewhere). One or more memory buses (which may each include an address bus and a data bus) may couple processor 302 to memory 304. Bus 312 may include one or more memory buses, as described below. In particular embodiments, one or more memory management units (MMUs) reside between processor 302 and memory 304 and facilitate accesses to memory 304 requested by processor 302. In particular embodiments, memory 304 includes random access memory (RAM). This RAM may be volatile memory, where appropriate. Where appropriate, this RAM may be dynamic RAM (DRAM) or static RAM (SRAM). Moreover, where appropriate, this RAM may be single-ported or multi-ported RAM. This disclosure contemplates any suitable RAM. Memory 304 may include one or more memories 304, where appropriate. Although this disclosure describes and illustrates particular memory, this disclosure contemplates any suitable memory.

In particular embodiments, storage 306 includes mass storage for data or instructions. As an example and not by way of limitation, storage 306 may include a hard disk drive (HDD), a floppy disk drive, flash memory, an optical disc, a magneto-optical disc, magnetic tape, or a Universal Serial Bus (USB) drive or a combination of two or more of these. Storage 306 may include removable or non-removable (or fixed) media, where appropriate. Storage 306 may be internal or external to computer system 300, where appropriate. In particular embodiments, storage 306 is non-volatile, solid-state memory. In particular embodiments, storage 306 includes read-only memory (ROM). Where appropriate, this ROM may be mask-programmed ROM, programmable ROM (PROM), erasable PROM (EPROM), electrically erasable PROM (EEPROM), electrically alterable ROM (EAROM), or flash memory or a combination of two or more of these. This disclosure contemplates mass storage 306 taking any suitable physical form. Storage 306 may include one or more storage control units facilitating communication between processor 302 and storage 306, where appropriate. Where appropriate, storage 306 may include one or more storages 306. Although this disclosure describes and illustrates particular storage, this disclosure contemplates any suitable storage.

In particular embodiments, I/O interface 308 includes hardware, software, or both, providing one or more interfaces for communication between computer system 300 and one or more I/O devices. Computer system 300 may include one or more of these I/O devices, where appropriate. One or more of these I/O devices may enable communication between a person and computer system 300. As an example and not by way of limitation, an I/O device may include a keyboard, keypad, microphone, monitor, mouse, printer, scanner, speaker, still camera, stylus, tablet, touch screen, trackball, video camera, another suitable I/O device or a combination of two or more of these. An I/O device may include one or more sensors. This disclosure contemplates any suitable I/O devices and any suitable I/O interfaces 308 for them. Where appropriate, I/O interface 308 may include one or more device or software drivers enabling processor 302 to drive one or more of these I/O devices. I/O interface 308 may include one or more I/O interfaces 308, where appropriate. Although this disclosure describes and illustrates a particular I/O interface, this disclosure contemplates any suitable I/O interface.

In particular embodiments, communication interface 310 includes hardware, software, or both providing one or more interfaces for communication (such as, for example, packet-based communication) between computer system 300 and one or more other computer systems 300 or one or more networks. As an example and not by way of limitation, communication interface 310 may include a network interface controller (NIC) or network adapter for communicating with an Ethernet or other wire-based network or a wireless NIC (WNIC) or wireless adapter for communicating with a wireless network, such as a WI-FI network. This disclosure contemplates any suitable network and any suitable communication interface 310 for it. As an example and not by way of limitation, computer system 300 may communicate with an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As an example, computer system 300 may communicate with a wireless PAN (WPAN) (such as, for example, a BLUETOOTH WPAN), a WI-FI network, a WI-MAX network, a cellular telephone network (such as, for example, a Global System for Mobile Communications (GSM) network, a Long-Term Evolution (LTE) network, or a 5G network), or other suitable wireless network or a combination of two or more of these. Computer system 300 may include any suitable communication interface 310 for any of these networks, where appropriate. Communication interface 310 may include one or more communication interfaces 310, where appropriate. Although this disclosure describes and illustrates a particular communication interface, this disclosure contemplates any suitable communication interface.

In particular embodiments, bus 312 includes hardware, software, or both coupling components of computer system 300 to each other. As an example and not by way of limitation, bus 312 may include an Accelerated Graphics Port (AGP) or other graphics bus, an Enhanced Industry Standard Architecture (EISA) bus, a front-side bus (FSB), a HYPERTRANSPORT (HT) interconnect, an Industry Standard Architecture (ISA) bus, an INFINIBAND interconnect, a low-pin-count (LPC) bus, a memory bus, a Micro Channel Architecture (MCA) bus, a Peripheral Component Interconnect (PCI) bus, a PCI-Express (PCIe) bus, a serial advanced technology attachment (SATA) bus, a Video Electronics Standards Association local bus (VLB), or another suitable bus or a combination of two or more of these. Bus 312 may include one or more buses 312, where appropriate. Although this disclosure describes and illustrates a particular bus, this disclosure contemplates any suitable bus or interconnect.

Herein, a computer-readable non-transitory storage medium or media may include one or more semiconductor-based or other integrated circuits (ICs) (such, as for example, field-programmable gate arrays (FPGAs) or application-specific ICs (ASICs)), hard disk drives (HDDs), hybrid hard drives (HHDs), optical discs, optical disc drives (ODDs), magneto-optical discs, magneto-optical drives, floppy diskettes, floppy disk drives (FDDs), magnetic tapes, solid-state drives (SSDs), RAM-drives, SECURE DIGITAL cards or drives, any other suitable computer-readable non-transitory storage media, or any suitable combination of two or more of these, where appropriate. A computer-readable non-transitory storage medium may be volatile, non-volatile, or a combination of volatile and non-volatile, where appropriate.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, feature, functions, operations, or steps, any of these embodiments may include any combination or permutation of any of the components, elements, features, functions, operations, or steps described or illustrated anywhere herein that a person having ordinary skill in the art would comprehend. Additionally, although this disclosure describes or illustrates particular embodiments as providing particular advantages, particular embodiments may provide none, some, or all of these advantages.

The embodiments disclosed herein are only examples, and the scope of this disclosure is not limited to them. Particular embodiments may include all, some, or none of the components, elements, features, functions, operations, or steps of the embodiments disclosed herein.

Modifications, additions, or omissions may be made to the elements shown in the figure above. The components of a device may be integrated or separated. Moreover, the functionality of a device may be performed by more, fewer, or other components. The components within a device may be communicatively coupled in any suitable manner. Functionality described herein may be performed by one device or distributed across multiple devices. In general, systems and/or components described in this disclosure as performing certain functionality may comprise non-transitory computer readable memory storing instructions and processing circuitry operable to execute the instructions to cause the system/component to perform the described functionality.

While several embodiments have been provided in the present disclosure, it should be understood that the disclosed systems and methods might be embodied in many other specific forms without departing from the scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry configured to execute program code stored in memory. The term unit may have conventional meaning in the field of electronics, electrical devices and/or electronic devices and may include, for example, electrical and/or electronic circuitry, devices, modules, processors, receivers, transmitters, memories, logic solid state and/or discrete devices, computer programs or instructions for carrying out respective tasks, procedures, computations, outputs, and/or displaying functions, and so on, as such as those that are described herein.

What is claimed is:

1. A system, comprising:
   one or more processors; and
   one or more computer-readable non-transitory storage media comprising instructions that, when executed by the one or more processors, cause one or more components of the system to perform operations comprising:

detecting, at a virtual authenticator in an endpoint device, a linkup event;
transmitting, to a supplicant in the endpoint device, a request for an identity associated with the endpoint device;
receiving, at the virtual authenticator, a response from the supplicant, wherein the response comprises the identity associated with the endpoint device;
transmitting, by the virtual authenticator to an authentication server, the identity associated with the endpoint device;
receiving, by the virtual authenticator from the authentication server, an authorization result, wherein the authorization result is based on authenticating the endpoint device using the identity associated with the endpoint device;
enforcing, by the virtual authenticator, the authorization result at the endpoint device;
receiving, by the virtual authenticator from the authentication server, a change of authorization; and
enforcing, by the virtual authenticator coupled with the supplicant within the endpoint device, the change of authorization at the endpoint device.

2. The system of claim 1, wherein the operation of enforcing the authorization result further comprises: communicating with an application installed on the endpoint device.

3. The system of claim 1, the operations further comprising: receiving, at the virtual authenticator from the authentication server, a virtual private network (VPN) required command; and transmitting, to a VPN client in the endpoint device, a VPN request.

4. The system of claim 1, the operations further comprising: receiving, by the virtual authenticator, one or more Domain Name System (DNS) entries; and installing, by the virtual authenticator, the one or more DNS entries in a DNS resolution file in the endpoint device.

5. The system of claim 1, wherein the operation of enforcing the authorization result further comprises: enforcing the authorization result using an Application Programming Interface (API) in the endpoint device.

6. The system of claim 1, wherein the operation of enforcing the authorization result further comprises: enforcing the authorization result using a firewall in the endpoint device.

7. A method, comprising:
detecting, at a virtual authenticator in an endpoint device, a linkup event;
transmitting, to a supplicant in the endpoint device, a request for an identity associated with the endpoint device;
receiving, at the virtual authenticator, a response from the supplicant, wherein the response comprises the identity;
transmitting, by the virtual authenticator to an authentication server, the identity associated with the endpoint device;
receiving, by the virtual authenticator from the authentication server, an authorization result, wherein the authorization result is based on authenticating the endpoint device using the identity associated with the endpoint device;
enforcing, by the virtual authenticator, the authorization result at the endpoint device;
receiving, by the virtual authenticator from the authentication server, a change of authorization; and
enforcing, by the virtual authenticator coupled with the supplicant within the endpoint device, the change of authorization at the endpoint device.

8. The method of claim 7, wherein enforcing of the authorization result further comprises: communicating with an application installed on the endpoint device.

9. The method of claim 7, the method further comprising: receiving, at the virtual authenticator from the authentication server, a virtual private network (VPN) required command; and transmitting, to a VPN client in the endpoint device, a VPN request.

10. The method of claim 7, the method further comprising: receiving, by the virtual authenticator, one or more Domain Name System (DNS) entries; and installing, by the virtual authenticator, the one or more DNS entries in a DNS resolution file in the endpoint device.

11. The method of claim 7, wherein enforcing of the authorization result further comprises: enforcing the authorization result using an Application Programming Interface (API) in the endpoint device.

12. The method of claim 7, wherein enforcing of the authorization result further comprises: enforcing the authorization result using a firewall in the endpoint device.

13. One or more computer-readable non-transitory storage media embodying instructions that, when executed by a processor, cause performance of operations comprising:
detecting, at a virtual authenticator in an endpoint device, a linkup event;
transmitting, to a supplicant in the endpoint device, a request for an identity associated with the endpoint device;
receiving, at the virtual authenticator, a response from the supplicant, wherein the response comprises the identity associated with the endpoint device;
transmitting, by the virtual authenticator to an authentication server, the identity associated with the endpoint device;
receiving, by the virtual authenticator from the authentication server, an authorization result, wherein the authorization result is based on authenticating the endpoint device using the identity associated with the endpoint device;
enforcing, by the virtual authenticator, the authorization result at the endpoint device;
receiving, by the virtual authenticator from the authentication server, a change of authorization; and
enforcing, by the virtual authenticator coupled with the supplicant within the endpoint device, the change of authorization at the endpoint device.

14. The one or more computer-readable non-transitory storage media of claim 13, wherein operation of enforcing the authorization result further comprises: communicating with an application installed on the endpoint device.

15. The one or more computer-readable non-transitory storage media of claim 13, the operations further comprising: receiving, at the virtual authenticator from the authentication server, a virtual private network (VPN) required command; and transmitting, to a VPN client in the endpoint device, a VPN request.

16. The one or more computer-readable non-transitory storage media of claim 13, the operations further comprising: receiving, by the virtual authenticator, one or more Domain Name System (DNS) entries; and installing, by the virtual authenticator, the one or more DNS entries in a DNS resolution file in the endpoint device.

17. The one or more computer-readable non-transitory storage media of claim 13, wherein operation of enforcing the authorization result further comprises: enforcing the authorization result using an Application Programming Interface (API) in the endpoint device.

18. The one or more computer-readable non-transitory storage media of claim 13, wherein operation of enforcing the authorization result further comprises: enforcing the authorization result using a firewall in the endpoint device.

\* \* \* \* \*